(12) United States Patent
Muroi (10) Patent No.: US 6,317,711 B1
(45) Date of Patent: Nov. 13, 2001

(54) SPEECH SEGMENT DETECTION AND WORD RECOGNITION

(75) Inventor: Tetsuya Muroi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/503,750

(22) Filed: Feb. 14, 2000

(30) Foreign Application Priority Data

Feb. 25, 1999 (JP) .................................................. 11-047302

(51) Int. Cl.$^7$ .............................. G10L 15/02; G10L 15/04
(52) U.S. Cl. .................... 704/253; 704/254; 704/251; 704/231
(58) Field of Search ..................................... 704/246, 253, 704/251, 231, 200, 254

(56) References Cited

U.S. PATENT DOCUMENTS

| | | | |
|---|---|---|---|
| 5,168,524 | * 12/1992 | Kroeker et al. ...................... | 704/254 |
| 5,548,681 | * 8/1996 | Gleaves et al. ...................... | 704/256 |
| 5,732,394 | * 3/1998 | Nakadai et al. ...................... | 704/252 |
| 5,799,276 | * 8/1998 | Komissarchik et al. .............. | 704/251 |

FOREIGN PATENT DOCUMENTS

| 1244497 | 9/1989 | (JP) . |
|---|---|---|
| 9-50288 | 2/1997 | (JP) . |

* cited by examiner

*Primary Examiner*—Richemond Dorvil
*Assistant Examiner*—Daniel A Nolan
(74) *Attorney, Agent, or Firm*—Cooper & Dunham LLP (57) ABSTRACT

In a speech segment detection method, a sequence of speech samples is provided from an input speech signal and a sequence of feature vectors is provided from the speech samples, the feature vectors having respective speech power levels. A minimum speech power among the speech power levels in the feature vector sequence is detected. Normalized speech power levels are computed based on the speech power levels and the minimum speech power. Each of the normalized speech power levels is compared with a predetermined threshold value to detect speech segments in the input speech signal. Further, a speech recognition system and method and a computer-readable medium, using the speech segment detection method, are also disclosed.

12 Claims, 9 Drawing Sheets

SPEECH SEGMENT DETECTION AND WORD RECOGNITION

BACKGROUND OF THE INVENTION

1. Field of the Invention

The present invention relates to a speech segment detection method, and a speech recognition system and method in which the speech segment detection method is utilized. Further, the present invention relates to a computer-readable medium storing program code instructions that cause the processor to carry out the speech segment detection method.

2. Description of the Related Art

Speech recognition by machine has proven an extremely difficult task. One complicating factor is that, unlike written text, no clear spacing exists between spoken words; speakers typically utter full phrases or sentences without pause. Further, acoustic variability in the speech signal typically precludes an unambiguous mapping to a sequence of words or subword units, such as pronunciations of consonants and vowels. One major source of variability in speech is coarticulation, or the tendency for the acoustic characteristics of a given speech sound or phone sound to differ depending upon the phonetic context in which it is produced.

Speech recognizers can be categorized by the speaking styles, vocabularies, and language models that they accommodate. Isolated word recognizers require speakers to insert brief pauses between individual words. Continuous speech recognizers operate on fluent speech, but typically employ strict language models, or grammars, to limit the number of allowable word sequences. Wordspotters operate on fluent speech as input. However, rather than providing full transcription, wordspotters selectively locate relevant words or phrases in an utterance. Wordspotting is useful both in information-retrieval tasks based on keyword indexing and as an alternative to isolated word recognition in voice command applications.

In principle, the wordspotting technique does not require detecting a speech segment in the input speech signal. However, in practical applications, there are some cases in which the detection of speech segments prior to the recognition process is needed to determine word recognition timing or determine a selected range of the input speech signal to be recognized. If wordspotting is applied, in such cases, to the entire range of the input speech without detecting the speech segments, the processing load will be significantly increased, which is detrimental to quickly obtaining the results of recognition. Hence, the detection of speech segments in the input speech signal is very useful for practical applications of speech recognition.

For example, Japanese Laid-Open Patent Application No.1-244497 discloses a speech segment detection method of one type. In this detection method, an average noise power over some frames of an input signal just following the starting time of a speech segment detection process is calculated, and a speech segment in the input speech signal is detected through the comparison with a threshold level that is varied by the average noise power.

Figure 11:
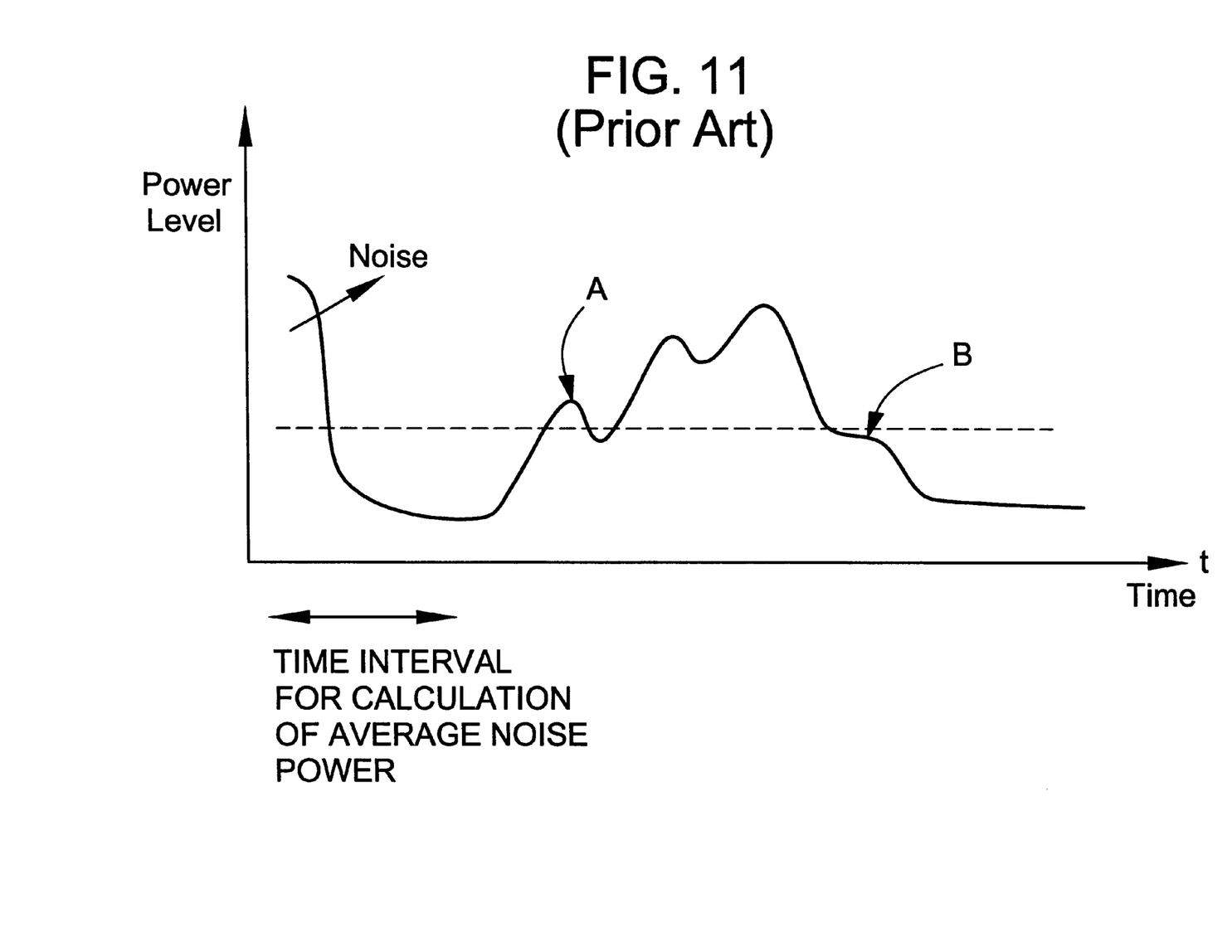
FIG. 11 is a diagram for explaining a problem with conventional speech segment detection methods.

However, the conventional method in the above publication has a problem in effectively detecting the speech segment when a relatively large noise (e.g., a key-depressing sound) takes place just following the time the speech segment detection process is started. A waveform of the input speech signal in such a condition is shown in FIG. 11. In the case of the waveform shown in FIG. 11, it is difficult for the conventional method to accurately detect a start-point of the speech segment (such as one indicated by the arrow "A" in FIG. 11) or an end point of the speech segment (such as one indicated by the arrow "B" in FIG. 11) since an excessively large threshold level (indicated by the dotted line in FIG. 11) is provided due to the average noise power calculated by including the relatively large noise.

Japanese Laid-Open Patent Application No.9-050288 discloses another speech segment detection method. In this speech segment detection method, a portion of an input speech signal in which the amplitude of the input speech signal exceeds a predetermined threshold level is detected as being a startpoint of a speech segment contained in the input speech signal.

Another portion of the input speech signal in which the amplitude is less than the threshold level is detected as being an end point of the speech segment. In this manner, the speech segment in the input speech signal is identified based on the start-point and the end point.

However, the conventional method in the above publication also does not eliminate the above-described problem. In the case of the waveform shown in FIG. 11, it is difficult for the conventional method to accurately detect a start-point of the speech segment or an end point of the speech segment when a relatively large noise takes place just following the starting time of the speech segment detection process.

SUMMARY OF THE INVENTION

In order to overcome the problems described above, preferred embodiments of the present invention provide an improved speech segment detection method that effectively detects speech segments in the input speech signal even when a relatively large noise takes place just following the starting time of the speech segment detection process.

According to one preferred embodiment of the present invention, a speech segment detection method in which a sequence of speech samples is provided from an input speech signal and a sequence of feature vectors is provided from the speech samples, the feature vectors having respective speech power levels, the speech segment detection method including the steps of: detecting a minimum speech power among the speech power levels in the feature vector sequence; computing normalized speech power levels based on the speech power levels and the minimum speech power; and comparing each of the normalized speech power levels with a predetermined threshold value to detect speech segments in the input speech signal.

In the speech segment detection method of the preferred embodiment, the minimum speech power among the received speech power levels is detected to obtain the normalized speech power levels, and a speech segment in the input speech signal is detected through the comparison of each of the normalized speech power levels with a predetermined threshold value. The speech segment detection method of the present invention is effective in accurately detecting speech segments in the input speech signal even when a relatively large noise takes place just following the starting time of the speech segment detection process.

According to another preferred embodiment of the present invention, a speech recognition system using the speech segment detection method, includes: a speech input unit which converts an input speech signal into a sequence of speech samples; a feature extraction unit which provides a sequence of feature vectors from the speech samples provided by the speech input unit, the feature vectors having respective speech power levels; a speech segment detection unit which detects speech segments in the input speech signal based on the speech power levels supplied from the feature extraction unit, the speech segment detection unit detecting a minimum speech power among the speech power levels, computing normalized speech power levels based on the speech power levels and the minimum speech power, and comparing each of the normalized speech power levels with a predetermined threshold value to detect the speech segments; and a recognition unit which transforms the sequence of feature vectors into an appropriate message by comparing the feature vectors, respectively identified by the speech segments detected by the speech segment detection unit, with a set of standard patterns.

According to another preferred embodiment of the present invention, a speech recognition method using the speech segment detection method, includes the steps of: converting an input speech signal into a sequence of speech samples; providing a sequence of feature vectors from the speech samples, the feature vectors having respective speech power levels; detecting speech segments in the input speech signal based on the speech power levels, the speech segment detection being carried out by detecting a minimum speech power among the speech power levels, computing normalized speech power levels based on the speech power levels and the minimum speech power, and comparing each of the normalized speech power levels with a predetermined threshold value; and transforming the sequence of feature vectors into an appropriate message by comparing the feature vectors, respectively identified by the detected speech segments, with a set of standard patterns.

The speech recognition system and method of the present invention is effective in achieving accurate speech recognition even when a relatively large noise takes place just following the start of the speech recognition process.

According to another preferred embodiment of the present invention, a computer-readable medium storing program code instructions for causing a processor to carry out a speech segment detection method in which a sequence of speech samples is provided from an input speech signal and a sequence of feature vectors is provided from the speech samples, the feature vectors having respective speech power levels, the computer-readable medium including: a first program code device which causes the processor to detect a minimum speech power among the speech power levels in the feature vector sequence; a second program code device which causes the processor to compute normalized speech power levels based on the speech power levels and the minimum speech power; and a third program code device which causes the processor to compare each of the normalized speech power levels with a predetermined threshold value to detect speech segments in the input speech signal.

The computer-readable medium of the present invention is effective in providing the speech segment detection method that effectively detects speech segments in the input speech signal even when a relatively large noise takes place just following the starting time of the speech segment detection process.

BRIEF DESCRIPTION OF THE DRAWINGS

Other objects, features and advantages of the present invention will become apparent from the following detailed description when read in conjunction with the accompanying drawings in which.

DETAILED DESCRIPTION OF PREFERRED EMBODIMENTS

A description will now be provided of preferred embodiments of the present invention with reference to the accompanying drawings.

Figure 1:
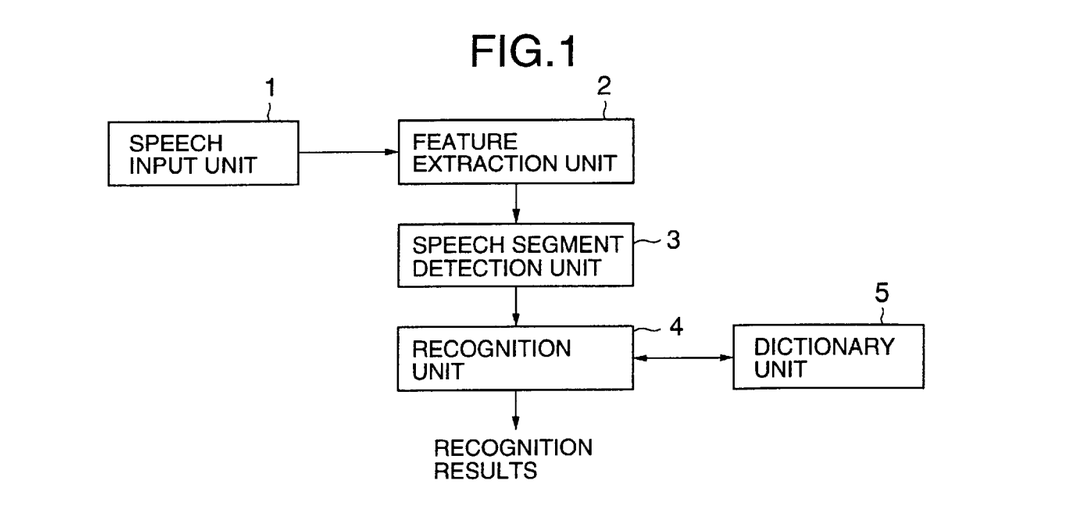
FIG. 1 is a block diagram of a speech recognition system to which one preferred embodiment of the speech segment detection method of the invention is applied.

FIG. 1 is a block diagram of a speech recognition system to which one preferred embodiment of the speech segment detection apparatus of the invention is applied.

In the speech recognition system of FIG. 1, a speech signal is input to the system by using a speech input unit 1. The speech input unit 1 uses an analog transducer, such as a microphone, to input the speech signal to the system. The speech input unit 1 includes an analog-to-digital converter (ADC) which converts the input speech signal to digital form. A feature extraction unit 2 computes a sequence of acoustic feature vectors by processing the speech samples, supplied from the ADC of the speech input unit 1, in successive time intervals. The sequence of acoustic feature vectors provided is supplied from the feature extraction unit 2 to a speech segment detection unit 3.

The sequence of acoustic feature vectors is produced by the feature extraction unit 2 using a known feature extraction technique. In the present embodiment, the sampling frequency is 8 kHz. The feature extraction unit 2 produces a sequence of acoustic feature vectors from the input speech samples in successive time intervals of 10 msec, and speech power levels and cepstral parameters of the input speech samples are extracted from the feature vectors in the feature vector sequence. The type of parameterization used is LPC cepstra and MEL cepstra. The order for the cepstral parameters is set to 10.

In the speech recognition system of FIG. 1, after all the speech power levels and the cepstral parameters are provided from the sequence of acoustic feature vectors by the feature extraction unit 2, the speech segment detection unit 3 detects a minimum speech power among the received speech power levels. The speech segment detection unit 3 computes normalized speech power levels from the speech power sequence by dividing the individual speech power levels by the minimum speech power. The speech segment detection unit 3 detects individual speech segments in the input speech signal through the comparison of each of the normalized speech power levels with a predetermined threshold value. The thus detected speech segments are supplied from the speech segment detection unit 3 to a recognition unit 4. The operations of the speech segment detection unit 3 will be described later in greater detail.

In the speech recognition system of FIG. 1, the recognition unit 4 performs a recognition process for the input speech signal based on the detected speech segments supplied by the speech segment detection unit 3. Recognition of an unknown utterance involves transforming the sequence of feature vectors, or codewords, into an appropriate message. The recognition process is constrained by a dictionary unit 5, and the dictionary unit 5 defines the vocabulary of the speech recognition system in terms of the basic units of speech used by the system. Specifically, the dictionary unit 5 is learned from a set of representative training data, and contains a set of standard patterns, corresponding to feature vectors of the basic words used by the system, stored therein as the result of the learning. The individual standard patterns stored in the dictionary unit 5 are suitably labeled, and each standard pattern can be identified using a corresponding label assigned to that pattern.

In the speech recognition system of FIG. 1, the recognition unit 4 produces results of recognition through the recognition process by using the vocabulary supplied by the dictionary unit 5. Specifically, during the recognition process, the recognition unit 4 compares the feature vectors of the input speech sequence, identified by the detected speech segments respectively, with the set of standard patterns read from the dictionary unit 5. As a result of the comparison, the recognition unit 4 obtains the score for a word candidate or a keyword. By repeating this procedure for all of the feature vectors in the input speech sequence, the recognition unit 4 produces, as the results of the recognition, an appropriate message that includes keywords extracted from the input speech signal.

The speech recognition system in the above-described embodiment carries out the word recognition for an unknown utterance. However, the speech recognition system according to the present invention is not limited to this embodiment. The word recognition scheme of the above-described embodiment can be easily extended to a sentence recognition scheme.

Next, a description will be provided of the operations of the speech segment detection unit 3 with reference to FIG. 2 through FIG. 6.

In the present embodiment, the input speech signal is transformed at the feature extraction unit 2 into a sequence of acoustic feature vectors, and the speech segment detection unit 3 receives the speech power levels corresponding to the feature vectors in the feature vector sequence. Then, the speech segment detection unit 3 performs a speech segment detection process for each of a number of frames of the feature vector sequence in successive time intervals in a sequential manner from the first frame to the last one. In this speech segment detection process, each of the frames of the feature vector sequence is identified by a frame number, and this frame number is indicated by a variable "i" that is stored in a memory of the speech segment detection unit 3. A variable "pmin" is used to indicate a currently valid minimum speech power and is stored in the memory of the speech segment detection unit 3. Further, a variable "state" is used to denote the current state of one of the frames of the feature vector sequence and stored in the memory of the speech segment detection unit 3.

Figure 2:
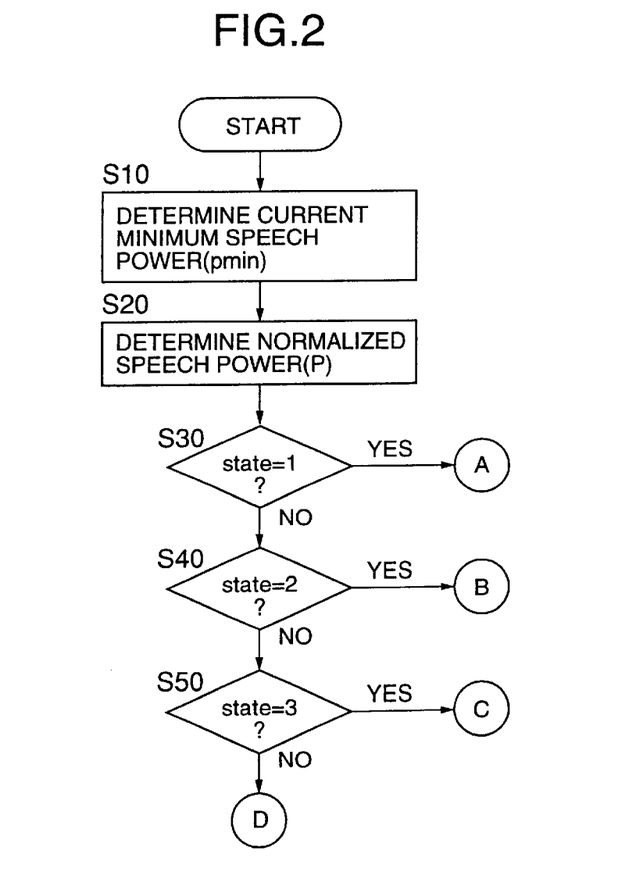
FIG. 2 is a flowchart for explaining a main routine of a speech segment detection process performed by a speech segment detection unit in the speech recognition system of FIG. 1.

FIG. 2 shows a main routine of the speech segment detection process executed by a central processing unit (CPU) of the speech segment detection unit 3 in the speech recognition system of FIG. 1. Hereinafter, this CPU will be referred to as the processor, and the speech segment detection unit 3 that causes the CPU (or the processor) to execute the speech segment detection process will be called the detection unit 3.

Upon a start of the speech segment detection process, the variables "i", "pmin" and "state" are initialized. The minimum speech power variable "pmin" is initially set to an infinite speech power, which indicates the currently valid minimum speech power. The frame number variable "i" is initially set to zero, which indicates the first frame of the feature vector sequence. Then, the variable "i" is sequentially incremented every time the detection unit 3 starts performing the speech segment detection process of FIG. 2 for one of the frames of the feature vector sequence. The variable "state" is initially set to 1.

In the main routine shown in FIG. 2, the detection unit 3 at first causes the processor to compare a speech power level, corresponding to one of the feature vectors indicated by the variable "i", with the minimum speech power indicated by the variable "pmin". When the speech power level of the current frame "i" is smaller than the minimum speech power "pmin" the speech power level of the frame "i" is determined as a new minimum speech power. The detection unit 3 causes the processor to put the speech power level of the frame "i" into the variable "pmin" (S10). That is, the minimum speech power indicated by the variable "pmin" is stored in the memory.

After the step S10 is performed, the detection unit 3 causes the processor to calculate a normalized speech power level by dividing the speech power level of the frame "i" by the current minimum speech power of the variable "pmin", and to put the normalized speech power level into a memory area "P" (S20). Alternatively, the normalized speech power level may be provided by subtracting the current minimum speech power of the variable "pmin" from the speech power level of the frame "i".

After the step S20 is performed, the detection unit 3 causes the processor to determine whether the current state of the frame indicated by the variable "state" is equal to 1 (S30). When the result at the step S30 is affirmative, the detection unit 3 causes the processor to proceed to a start-point candidate judgment sub-routine shown in FIG. 3, as indicated by the letter "A" in FIG. 2. That is, setting the state of the frame to 1 means that the speech power level be subjected to the start-point candidate judgment sub-routine of FIG. 3.

When the result at the step S30 is negative, the detection unit 3 causes the processor to proceed to the next step S40. The detection unit 3 causes the processor to determine whether the current state of the frame indicated by the variable "state" is equal to 2 (S40). When the result at the step S40 is affirmative, the detection unit 3 causes the processor to proceed to a startpoint determination sub-routine shown in FIG. 4, as indicated by the letter "B" in FIG. 2. That is, setting the state of the frame to 2 means that the speech power level of the frame should be subjected to the start-point determination sub-routine of FIG. 4.

When the result at the step S40 is negative, the detection unit 3 causes the processor to proceed to the step S50. The detection unit 3 causes the processor to determine whether the current state of the frame indicated by the variable "state" is equal to 3 (S50). When the result at the step S50 is affirmative, the detection unit 3 causes the processor to proceed to an end-point candidate judgment sub-routine shown in FIG. 5, as indicated by the letter "C" in FIG. 2. That is, setting the state of the frame to 3 means that the speech power level of the frame should be subjected to the end-point candidate judgment sub-routine of FIG. 5.

Figure 6:
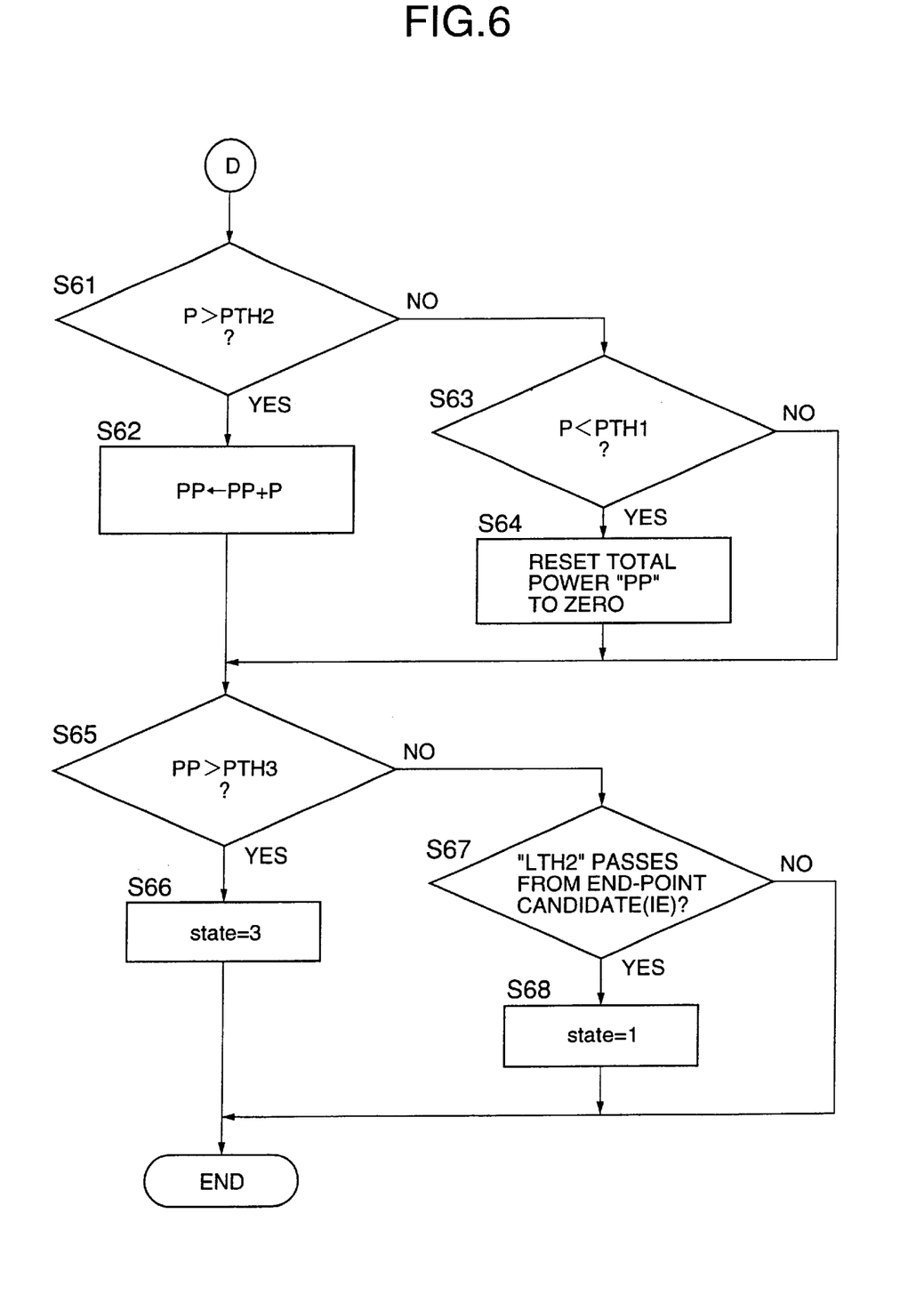
FIG. 6 is a flowchart for explaining an end-point determination sub-routine performed in the speech segment detection process of FIG. 2.

When the result at the step S50 is negative, the detection unit 3 causes the processor to proceed to an end-point determination sub-routine shown in FIG. 6, as indicated by the letter "D" in FIG. 2. That is, setting the state of the frame to 4 means that the speech power level of the frame should be subjected to the end-point determination sub-routine of FIG. 6.

Figure 3:
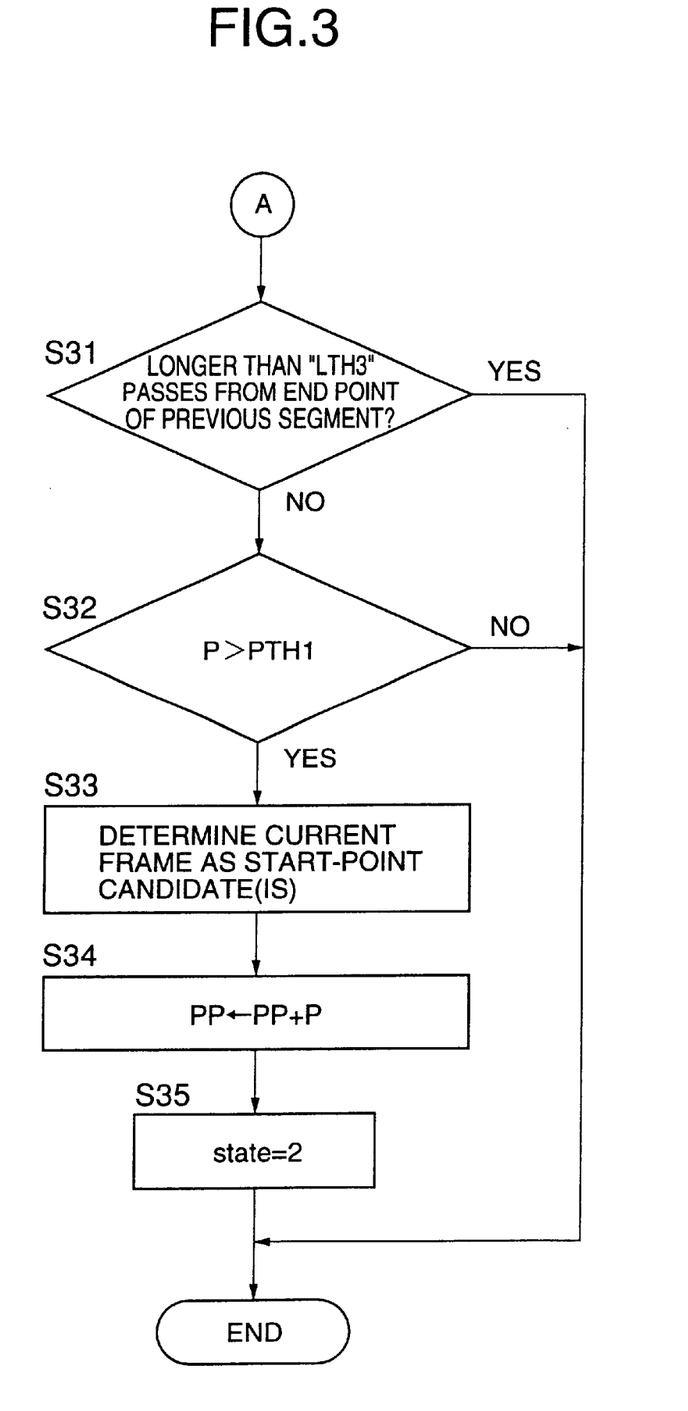
FIG. 3 is a flowchart for explaining a start-point candidate judgment sub-routine performed in the speech segment detection process of FIG. 2.

FIG. 3 shows a start-point candidate judgment sub-routine performed in the speech segment detection process of FIG. 2.

When the sub-routine of FIG. 3 starts, the detection unit 3 causes the processor to determine whether a time interval longer than the time interval indicated by a time threshold "LTH3" has passed from the frame of an end point of a previous speech segment to the current frame "i" (S31). When the time interval "LTH3" has already passed, it is determined that the input speech signal is not provided further. The detection unit 3 causes the processor to terminate the speech segment detection process, and the control will be transferred from the detection unit 3 to the recognition unit 4.

In the present embodiment, the time threshold "LTH3" is preset to about 0.3 seconds, which is appropriate for the word recognition scheme. For the sentence recognition scheme, the time threshold "LTH3" may be appropriately set to about 1 second.

When the result at the step S31 is negative, the detection unit 3 causes the processor to determine whether the normalized power level "P" is larger than the power level indicated by a power threshold "PTH1" (S32). When the result at the step S32 is affirmative (P>PTH1), the detection unit 3 causes the processor to proceed to the next step S33. When the result at the step S32 is negative (P≦PTH1), the detection unit 3 causes the processor to finish the speech segment detection process for the current frame, in order to start performing the speech segment detection process for the next frame.

In the present embodiment, the power threshold "PTH1" is preset to a power level that is on the order of an average speech power of the consonants "s", "h", etc.

When the result at the step S32 is affirmative (P>PTH1), the detection unit 3 causes the processor to determine the current frame (i) as being a start-point candidate for a speech segment in the input speech signal (S33). In the step S33, the detection unit 3 causes the processor to put the frame number "i" of the start-point candidate into a memory area "IS" (IS←i).

After the step S33 is performed, the detection unit 3 causes the processor to add the normalized speech power level "P" into a total power "PP" (S34). That is, a cumulative sum of the total power PP and the normalized speech power level P is stored into the total power PP (PP←PP+P).

After the step S34 is performed, the detection unit 3 causes the processor to set the variable "state" to 2 (S35). As described above, when the variable "state" is set to 2, the speech power level is subjected to the start-point determination sub-routine of FIG. 4. The detection unit 3 causes the processor to finish the speech segment detection process for the current frame, in order to start performing the speech segment detection process for the next frame.

Figure 4:
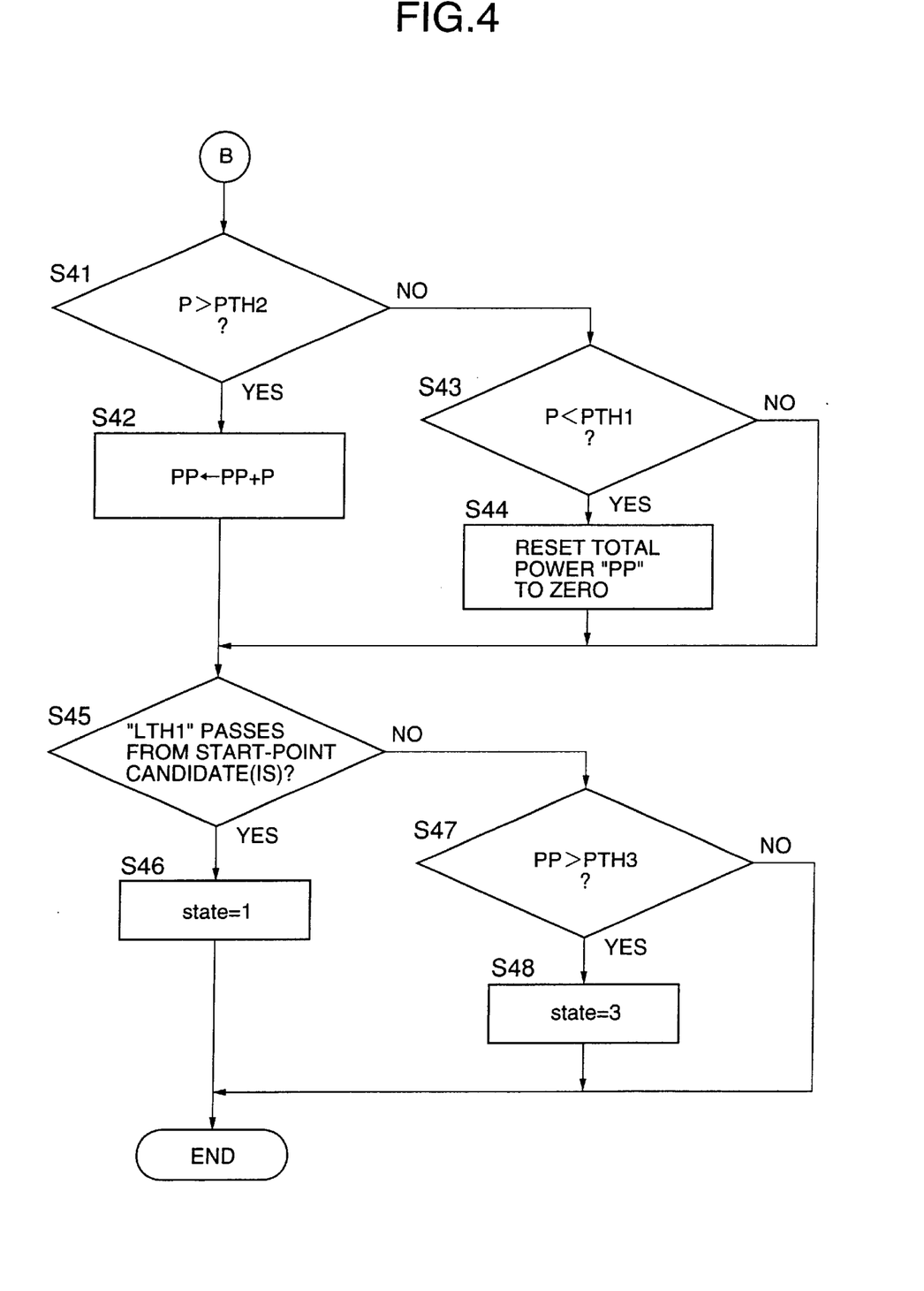
FIG. 4 is a flowchart for explaining a start-point determination sub-routine performed in the speech segment detection process of FIG. 2.

FIG. 4 shows a start-point determination sub-routine performed in the speech segment detection process of FIG. 2.

When the sub-routine of FIG. 4 starts, the detection unit 3 causes the processor to determine whether the normalized speech power level "P" is larger than the power level indicated by a power threshold "PTH2" (S41). Suppose that the power threshold PTH2 is larger than the power threshold PTH1 (PTH2<PTH1). When the result at the step S41 is affirmative (P>PTH2), the detection unit 3 causes the processor to add the normalized speech power level "P" to the total power "PP" (S42). In the step S42, a cumulative sum of the total power PP and the normalized speech power level P is stored into the total power PP (PP←PP+P).

On the other hand, when the result at the step S41 is negative (P≦PTH2), the detection unit 3 causes the processor to determine whether the normalized speech power level "P" is less than the power level indicated by the power threshold "PTH1" (S43). When the result at the step S43 is affirmative (P<PTH1), the detection unit 3 causes the processor to reset the total power PP to zero (S44), and to proceed to the next step S45. When the result at the step S43 is negative (P≧PTH1), the detection unit 3 causes the processor to proceed to the next step S45 without executing the step S44.

After any of the steps S42, S43 and S44 is performed, the detection unit 3 causes the processor to determine whether the time interval indicated by a time threshold "LTH1" has passed from the frame of the start-point candidate IS (S45). When the result at the step S45 is affirmative, the detection unit 3 causes the processor to set the variable "state" to 1 (S46). In the step S46, the detection unit 3 causes the processor to cancel the frame of the start-point candidate IS and to determine the start-point candidate IS as being a noise, not a part of the input speech signal. After the step S46 is performed, the detection unit 3 causes the processor to finish the speech segment detection process for the current frame, in order to start performing the speech segment detection process for the next frame.

When the result at the step S45 is negative, the detection unit 3 causes the processor to determine whether the total power "PP" is larger than the power level indicated by a power threshold "PTH3" (S47). In the present embodiment, the power threshold "PTH3" is preset to a power level that is three times an average speech power of the vowels "a", etc.

When the result at the step S47 is affirmative (P>PTH3), the detection unit 3 causes the processor to set the variable "state" to 3 (S48). In the step S48, the detection unit 3 causes the processor to determine the frame of the start-point candidate IS as being a starting point of a speech segment in the input speech signal. Then, the detection unit 3 causes the processor to finish the speech segment detection process for the current frame.

On the other hand, when the result at the step S47 is negative (P≦PTH3), the detection unit 3 causes the processor to finish the speech segment detection process for the current frame without performing the step S48. Then, the speech segment detection process for the next frame will be started.

Figure 5:
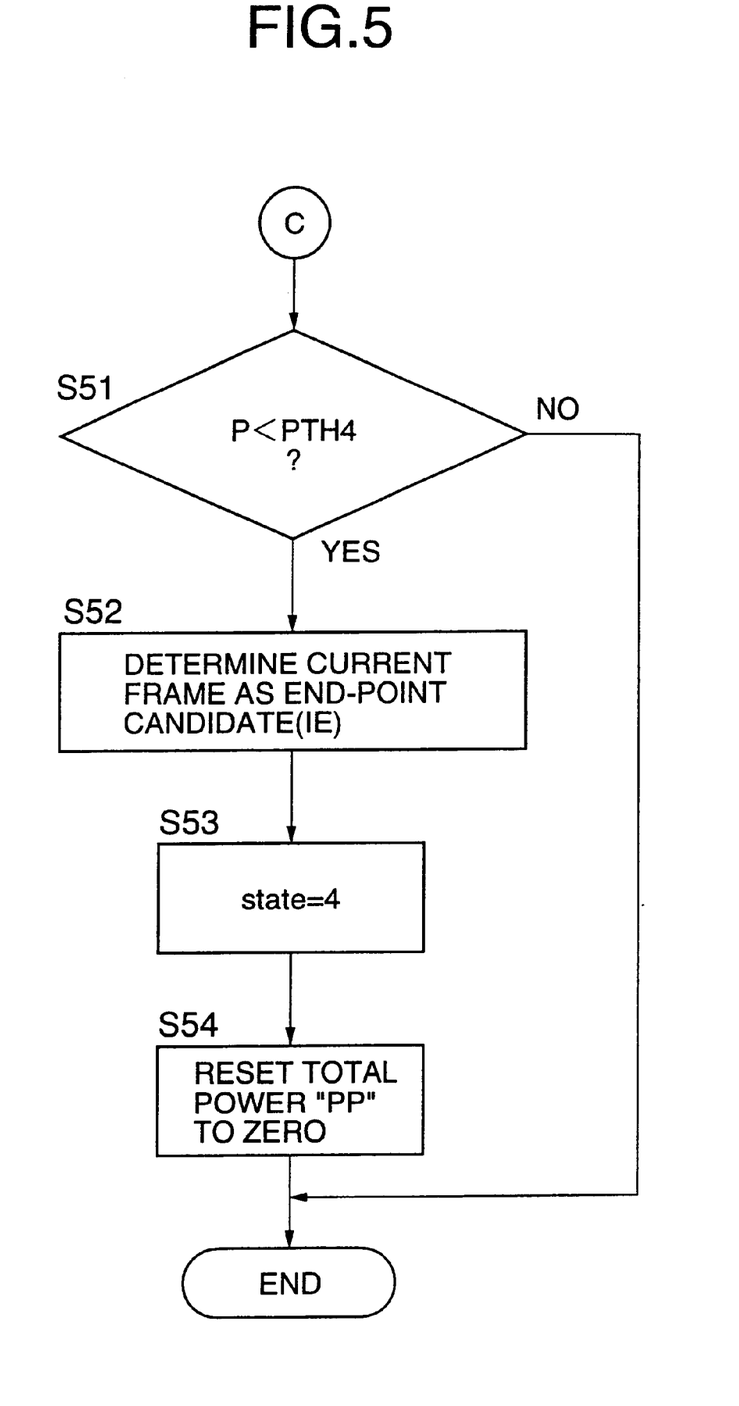
FIG. 5 is a flowchart for explaining an end-point candidate judgment sub-routine performed in the speech segment detection process of FIG. 2.

FIG. 5 shows an end-point candidate judgment sub-routine performed in the speech segment detection process of FIG. 2.

When the sub-routine of FIG. 5 starts, the detection unit 3 causes the processor to determine whether the normalized speech power level "P" is less than the power level indicated by a power threshold "PTH4" (S51). When the result at the step S51 is negative (P>PTH4), the detection unit 3 causes the processor to finish the end-point candidate judgment sub-routine for the current frame without performing the subsequent steps. Then, the speech segment detection process for the next frame will be started.

In the present embodiment, the power threshold "PTH4" is preset to a power level that is on the order of the average speech power of the vowels.

When the result at the step S51 is affirmative (P<PTH4), the detection unit 3 causes the processor to determine the current frame (i) as being an end-point candidate for a speech segment in the input speech signal (S52). In the step S52, the detection unit 3 causes the processor to put the frame number "i" of the end-point candidate into a memory area "IE" (IE←i).

After the step S52 is performed, the detection unit 3 causes the processor to set the variable "state" to 4 (S53). As described above, when the variable "state" is set to 4, the speech power level is subjected to the end-point determination sub-routine of FIG. 6.

After the step S53 is performed, the detection unit 3 causes the processor to reset the total power "PP" to zero (S54). After the step S54 is performed, the detection unit 3 causes the processor to finish the speech segment detection process for the current frame, in order to start performing the speech segment detection process for the next frame.

FIG. 6 shows an end-point determination sub-routine performed in the speech segment detection process of FIG. 2.

When the sub-routine of FIG. 6 starts, the detection unit 3 causes the processor to determine whether the normalized speech power level "P" is larger than the power level indicated by the power threshold PTH2 (S61).

When the result at the step S61 is affirmative, the detection unit 3 causes the processor to add the normalized speech power level "P" to the total power "PP" (S62). In the step S62, a cumulative sum of the total power PP and the normalized speech power level P is stored into the total power PP (PP←PP+P).

When the result at the step S61 is negative, the detection unit 3 causes the processor to determine whether the normalized power level "P" is less than the power level indicated by the power threshold "PTH1" (S63). When the result at the step S63 is affirmative (P<PTH1), the detection unit 3 causes the processor to reset the total power PP to zero (S64). After the step S64 is performed, the detection unit 3 causes the processor to proceed to the next step S65.

When the result at the step S63 is negative (P≧PTH1), the detection unit 3 causes the processor to proceed to the next step S65 without performing the step S64.

After any of the steps S62, S63 and S64 is performed, the detection unit 3 causes the processor to determine whether the total power "PP" is larger than the power level indicated by the power threshold "PTH3" (S65).

When the result at the step S65 is affirmative (PP>PTH3), the detection unit 3 causes the processor to set the variable "state" to 3 (S66). In the step S66, the detection unit 3 causes the processor to cancel the frame of the end-point candidate IE and determine the end-point candidate IE as not yet being an end point of a speech segment in the input speech signal. After the step S66 is performed, the detection unit 3 causes the processor to finish the speech segment detection process for the current frame, in order to start performing the speech segment detection process for the next frame.

When the result at the step S65 is negative (PP≦PTH3), the detection unit 3 causes the processor to determine whether the time interval indicated by a time threshold "LTH2" has passed from the frame of the end-point candidate "IE" (S67). In the present embodiment, the time threshold "LTH2" is preset to about 0.35 seconds.

When the time interval "LTH2" has already passed, it is determined that the frame of the end-point candidate is an end point of a speech segment in the input speech signal. The detection unit 3 causes the processor to set the variable "state" to 1 (S68). In the step S68, the detection unit 3 causes the processor to determine the current frame as being an end point of a speech segment in the input speech signal.

On the other hand, when the result at the step S67 is negative, the detection unit 3 causes the processor to finish the end-point determination sub-routine without performing the step S68.

After the step S67 or the step S68 is performed, the detection unit 3 causes the processor to finish the speech segment detection process for the current frame, in order to start performing the speech segment detection process for the next frame.

Figure 7:
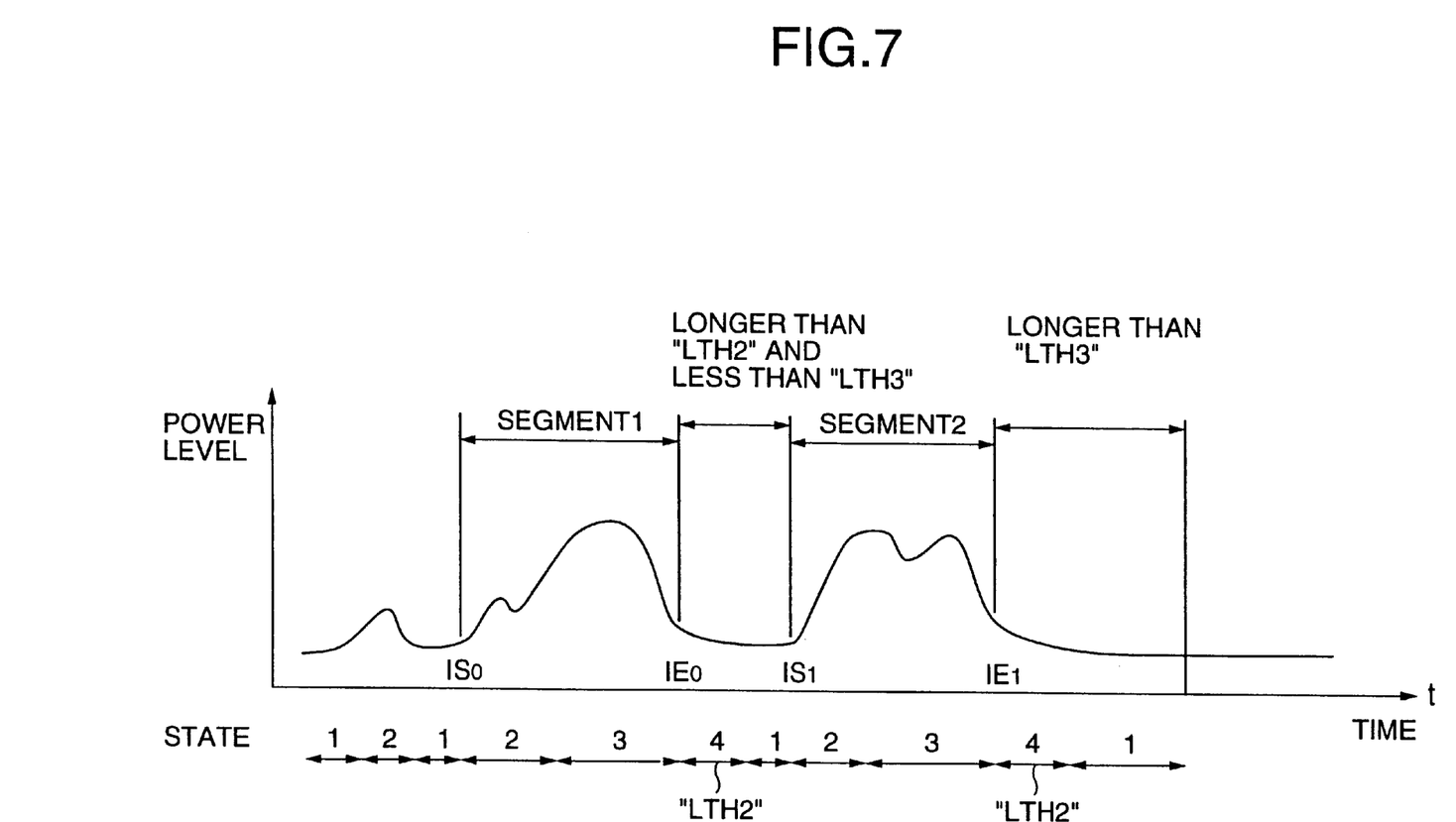
FIG. 7 is a diagram for explaining a transition of state number during the speech segment detection process of FIG. 2.

FIG. 7 is a diagram for explaining a transition of state number during the speech segment detection process of FIG. 2.

In the example of FIG. 7, two speech segments "SEGMENT1" and "SEGMENT2" in the input speech signal are detected through the performance of the speech segment detection process of FIG. 2. The frames of the feature vector sequence, corresponding to the starting and end points of the speech segment indicated by the SEGMENT1, are detected at "$IS_0$" and "$IE_0$", while the frames, corresponding to the starting and end points of the speech segment indicated the SEGMENT2, are detected at "$IS_1$" and "$IE_1$".

As shown in FIG. 7, the variable "state", which indicates the current state of the frame of the feature vector sequence, is changed in accordance with the waveform of the input speech signal during the speech segment detection process.

Figure 8:
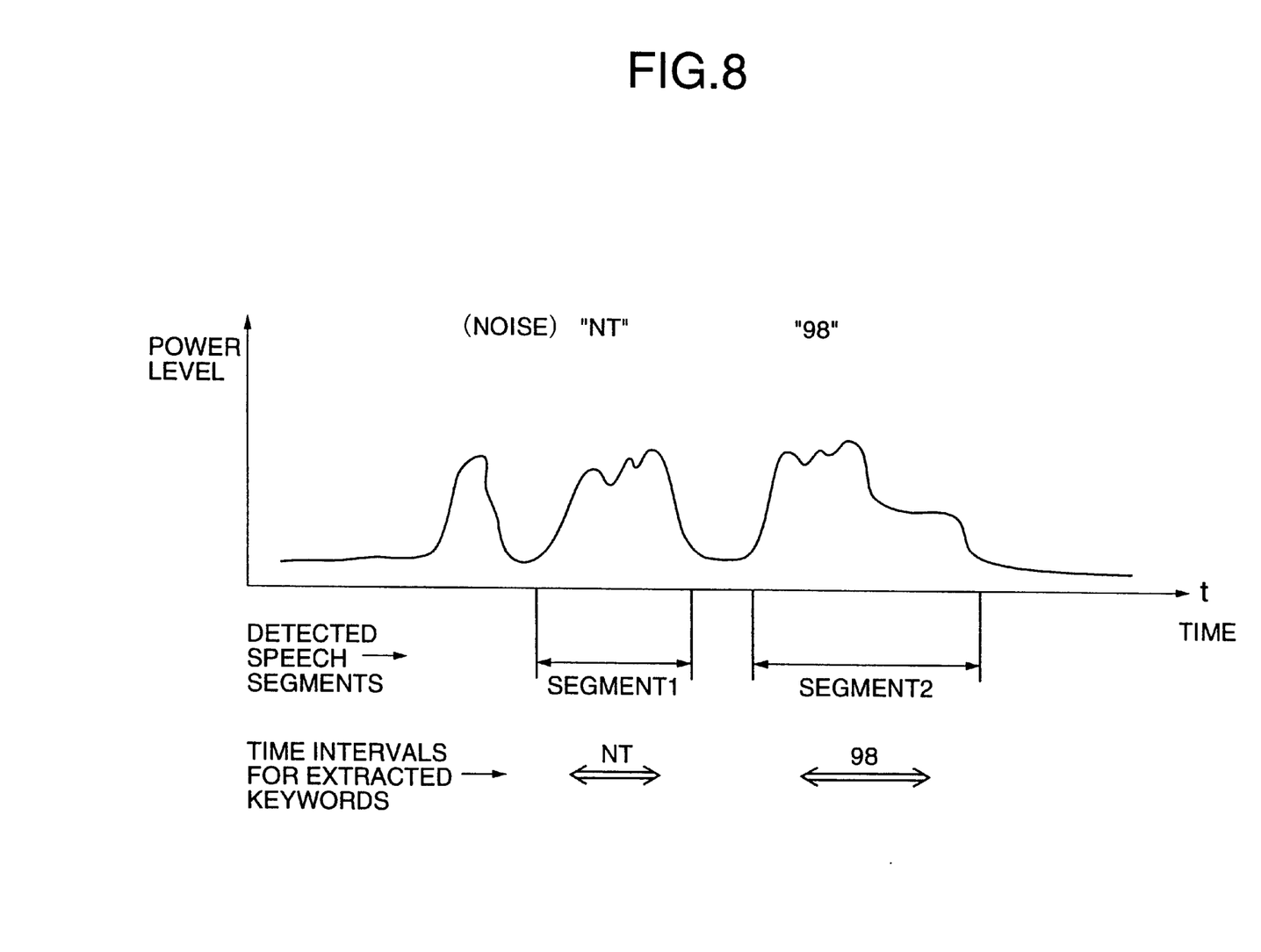
FIG. 8 is a diagram for explaining an operation of one preferred embodiment of the speech recognition system of the invention.

FIG. 8 shows an operation of one preferred embodiment of the speech recognition system of the invention.

In the present embodiment of the speech recognition system, the recognition unit 4 uses a known wordspotting technique to perform the recognition process on the feature vectors of the feature vector sequence that are respectively identified by the speech segments detected by the speech segment detection unit 3.

In the example of FIG. 8, an utterance "NT no 98 desu" in Japanese language is input to the speech recognition system by using the speech input unit 1. When a recognition start button (not shown) of the system is depressed by the operator, a relatively large noise takes place. Hence, the waveform of the input speech signal includes both the utterance and the noise occurring just following the start of the speech segment detection process.

In the example of FIG. 8, suppose that the speech segment detection unit 3 detects two speech segments, indicated by "SEGMENT1" and "SEGMENT2" in FIG. 8, in the input speech signal. The recognition unit 4 performs the recognition process on the feature vectors of the feature vector sequence that are respectively identified by the detected speech segments. Through the comparison of such feature vectors with the set of standard patterns read from the dictionary unit 5, the recognition unit 4 produces, as the results of the recognition, an appropriate message that includes extracted keywords "NT" and "98", as shown in FIG. 8.

Figure 9:
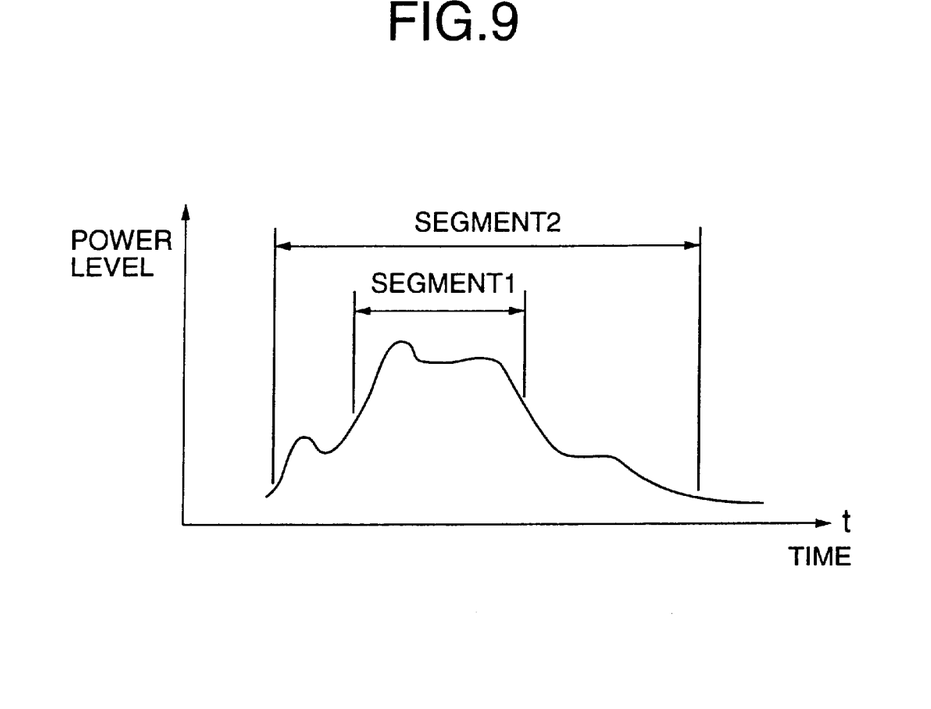
FIG. 9 is a diagram for explaining a modification of the speech recognition system of the invention when the speech segment detection process is done on a noisy speech signal.

FIG. 9 is a diagram for explaining a modification of the speech recognition system of the invention when the speech segment detection process is done on a noisy speech signal.

When the speech recognition system is used in a noisy environment, it is difficult to clearly distinguish between the noise and the consonants in the input speech signal by comparison of the normalized speech power levels with a set of standard patterns. It is appropriate in such a case to increase the power level indicated by the power threshold "PTH1". The increased power level of the power threshold "PTH1" is, for example, on the order of an average speech power of the vowels. By this modification, it is possible for the speech recognition system to accurately recognize at least the vowels in the input utterance.

When the above modification is made to the speech recognition system, a speech segment of an input speech signal that is detected by the speech segment detection unit 3 is shorter than an actual speech segment in the input utterance, as indicated by "SEGMENT1" in FIG. 9. It is appropriate in such a case to correct the speech segment "SEGMENT1" such that a given number of frames are inserted to both locations preceding at the starting point of the speech segment "SEGMENT1" and following the end point of the same. As a result of the correction, it is possible to obtain the speech segment, indicated by "SEGMENT2" in FIG. 9, which is approximate to the actual speech segment in the input utterance.

When the speech recognition system employs the wordspotting technique to perform the recognition process, the range of the input speech signal being subjected to the wordspotting becomes slightly wider if the insertion of some additional frames is made to the initially detected speech segment. However, the accuracy of the word recognition achieved by using the wordspotting will not be significantly influenced by the insertion of the additional frames.

Figure 10:
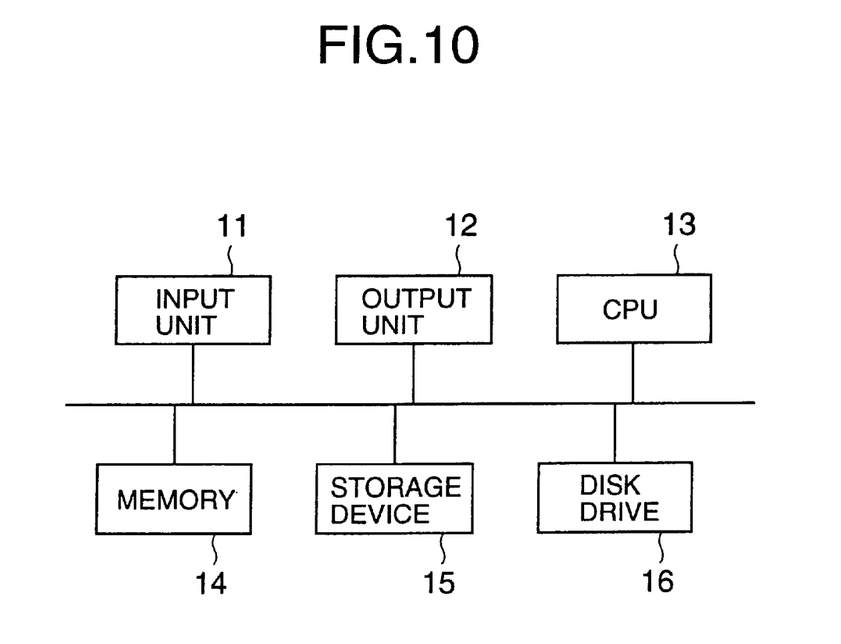
FIG. 10 is a block diagram of a hardware configuration of one preferred embodiment of the speech recognition system of the invention.

FIG. 10 shows a hardware configuration of one preferred embodiment of the speech recognition system of the invention.

The hardware configuration of FIG. 10 corresponds to the speech recognition system shown in FIG. 1. This configuration may be constructed by, for example, a personal computer.

In the configuration of FIG. 10, a speech signal is input to the speech recognition system by using an input unit 11. The results of recognition produced by the system for the input speech signal are output to an output unit 12. The speech segment detection process, which is related to the flowcharts of FIG. 2 through FIG. 6, is program code instructions that are stored in a memory 14 of the speech recognition system of FIG. 10. A CPU (central processing unit) 13 of the speech recognition system of FIG. 10 executes the program code instructions stored in the memory 14 in order to carry out the speech segment detection process. In addition, the memory 14 provides work areas that are used by the CPU 13 during the performance of the speech segment detection process.

In the configuration of FIG. 10, a storage device 15 provides storage areas where a word dictionary used for the speech recognition and the program code instructions related to the speech segment detection process are recorded. In addition, the storage device 15 provides work areas that are used by the CPU 13 during the performance of the speech segment detection process. A disk drive 16 is provided to receive a computer-readable medium, read the program code instructions from the computer-readable medium, and transfer them into the memory 14 or the storage device 15.

In the present embodiment of the speech recognition system, the memory 14 and the storage device 15 are computer-readable media, which store the program code instructions related to the speech segment detection process. The computer-readable media include any instruction storage device, such as, for example, magnetic tapes, magnetic disks including floppy disks and flexible disks, optical disks including MDs, CD-Rs, CD-ROMs and DVD-ROMs, magneto-optical disks including MOs, semiconductor memory devices such as ROMs (read-only memories), IC cards and miniature cards and other types of computer usable devices and media.

In the present embodiment, the memory of the speech recognition system may store encoded or non-encoded instructions. The program code instructions may be installed from a floppy disk or a CD-ROM to a hard disk drive of the speech recognition system first, loaded into a RAM of the system and then read by the processor of the speech recognition system. In addition, the memory of the speech recognition system may store either all or a part of the program code instructions related to the flowcharts of FIG. 2 through FIG. 6.

Further, in the present embodiment, the program code instructions related to the speech segment detection process may be installed in the speech recognition system by using not only computer-readable media but also communication channels.

The present invention is not limited to the abovedescribed embodiments, and variations and modifications may be made without departing from the scope of the present invention.

Further, the present invention is based on Japanese priority application No.11-047302, filed on Feb. 25, 1999, the entire contents of which are hereby incorporated by reference.

What is claimed is:

1. A speech segment detection method in which a sequence of speech samples is provided from an input speech signal and a sequence of feature vectors is provided from the speech samples, the feature vectors having respective speech power levels, the speech segment detection method comprising the steps of:

detecting a minimum speech power among the speech power levels in the feature vector sequence;

computing normalized speech power levels based on the speech power levels and the detected minimum speech power; and comparing each of the normalized speech power levels with a predetermined threshold value to detect speech segments in the input speech signal.

2. A speech segment detection method in which a sequence of speech samples is provided from an input speech signal and a sequence of feature vectors is provided from the speech samples, the feature vectors having respective speech power levels, wherein a number of frames of the feature vector sequence are provided at successive time intervals, the speech segment detection method comprising the steps of:

detecting a minimum speech power among the speech power levels in the feature vector sequence;

computing normalized speech power levels based on the speech power levels and the minimum speech power;

comparing each of the normalized speech power levels with a predetermined threshold value to detect speech segments in the input speech signal;

determining one of the frames as being a start-point candidate for a starting point of a speech segment in the input speech signal when the normalized speech power level for said one of the frames is larger than a first power threshold; and determining said one of the frames as being the starting point of the input speech signal when a cumulative sum of a total power and another normalized speech power level for a following one of the frames is larger than a second power threshold.

3. The speech segment detection method of claim 2, further comprising the steps of:

determining one of the frames as being an end-point candidate for an end point of a speech segment in the input speech signal when the normalized speech power level for said one of the frames is less than a third power threshold; and determining said one of the frames as being the end point of the input speech signal when a time interval indicated by a time threshold has passed from said one of the frames while a cumulative sum of a total power and another normalized speech power level for a following one of the frames is less than the second power threshold.

4. A speech recognition method using a speech segment detection method, comprising the steps of:

converting an input speech signal into a sequence of speech samples;

providing a sequence of feature vectors from the speech samples, the feature vectors having respective speech power levels;

detecting speech segments in the input speech signal based on the speech power levels, the speech segment detection being carried out by detecting a minimum speech power among the speech power levels, computing normalized speech power levels based on the speech power levels and the detected minimum speech power, and comparing each of the normalized speech power levels with a predetermined threshold value; and transforming the sequence of feature vectors into an appropriate message by comparing the feature vectors, respectively identified by the detected speech segments, with a set of standard patterns.

5. A speech recognition method using a speech segment detection method, comprising the steps of:

converting an input speech signal into a sequence of speech samples;

providing a sequence of feature vectors from the speech samples, the feature vectors having respective speech power levels, wherein a number of frames of the feature vector sequence are provided at successive time intervals;

detecting speech segments in the input speech signal based on the speech power levels, the speech segment detection being carried out by detecting a minimum speech power among the speech power levels, computing normalized speech power levels based on the speech power levels and the minimum speech power, comparing each of the normalized speech power levels with a predetermined threshold value, determining one of the frames as being a start-point candidate for a starting point of a speech segment in the input speech signal when the normalized speech power level for said one of the frames is larger than a first power threshold, and determining said one of the frames as being the starting point of the input speech signal when a cumulative sum of a total power and another normalized speech power level for a following one of the frames is larger than a second power threshold; and transforming the sequence of feature vectors into an appropriate message by comparing the feature vectors, respectively identified by the detected speech segments, with a set of standard patterns.

6. The speech recognition method of claim 5, wherein said step of the speech segment detection further includes the steps of:

determining one of the frames as being an end-point candidate for an end point of a speech segment in the input speech signal when the normalized speech power level for said one of the frames is less than a third power threshold; and determining said one of the frames as being the end point of the input speech signal when a time interval indicated by a time threshold has passed from said one of the frames while a cumulative sum of a total power and another normalized speech power level for a following one of the frames is less than the second power threshold.

7. A speech recognition system which uses a speech segment detection method, comprising:

a speech input unit which converts an input speech signal into a sequence of speech samples;

a feature extraction unit which provides a sequence of feature vectors from the speech samples provided by the speech input unit, the feature vectors having respective speech power levels;

a speech segment detection unit which detects speech segments in the input speech signal based on the speech power levels supplied from the feature extraction unit, the speech segment detection unit detecting a minimum speech power among the speech power levels, computing normalized speech power levels based on the speech power levels and the detected minimum speech power, and comparing each of the normalized speech power levels with a predetermined threshold value to detect the speech segments; and a recognition unit which transforms the sequence of feature vectors into an appropriate message by comparing the feature vectors, respectively identified by the speech segments detected by the speech segment detection unit, with a set of standard patterns.

8. A speech recognition system which uses a speech segment detection method, comprising:

a speech input unit which converts an input speech signal into a sequence of speech samples;

a feature extraction unit which provides a sequence of feature vectors from the speech samples provided by the speech input unit, the feature vectors having respective speech power levels, wherein a number of frames of the feature vector sequence are provided at successive time intervals;

a speech segment detection unit which detects speech segments in the input speech signal based on the speech power levels supplied from the feature extraction unit, the speech segment detection unit detecting a minimum speech power among the speech power levels, computing normalized speech power levels based on the speech power levels and the minimum speech power, and comparing each of the normalized speech power levels with a predetermined threshold value to detect the speech segments, wherein said speech segment detection unit determines one of the frames as being a start-point candidate for a starting point of a speech segment in the input speech signal when the normalized speech power level for said one of the frames is larger than a first power threshold, and said speech segment detection unit determining said one of the frames as being the starting point of the input speech signal when a cumulative sum of a total power and another normalized speech power level for a following one of the frames is larger than a second power threshold; and a recognition unit which transforms the sequence of feature vectors into an appropriate message by comparing the feature vectors, respectively identified by the speech segments detected by the speech segment detection unit, with a set of standard patterns.

9. The speech recognition system of claim 8, wherein said speech segment detection unit determines one of the frames as being an end-point candidate for an end point of a speech segment in the input speech signal when the normalized speech power level for said one of the frames is less than a third power threshold, and said speech segment detection unit determining said one of the frames as being the end point of the input speech signal when a time interval indicated by a time threshold has passed from said one of the frames while a cumulative sum of a total power and another normalized speech power level for a following one of the frames is less than the second power threshold.

10. A computer-readable medium storing program codes that cause a processor to execute a speech segment detection method in which a sequence of speech samples is provided from an input speech signal and a sequence of feature vectors is provided from the speech samples, the feature vectors having respective speech power levels, the computer-readable medium comprising:

first program code means for causing the processor to detect a minimum speech power among the speech power levels in the feature vector sequence;

second program code means for causing the processor to compute normalized speech power levels based on the speech power levels and the detected minimum speech power; and third program code means for causing the processor to compare each of the normalized speech power levels with a predetermined threshold value to detect speech segments in the input speech signal.

11. A computer-readable medium storing program codes that cause a processor to execute a speech segment detection method in which a sequence of speech samples is provided from an input speech signal and a sequence of feature vectors is provided from the speech samples, the feature vectors having respective speech power levels, wherein a number of frames of the feature vector sequence are provided at successive time intervals, the computer-readable medium comprising:

first program code means for causing the processor to detect a minimum speech power among the speech power levels in the feature vector sequence;

second program code means for causing the processor to compute normalized speech power levels based on the speech power levels and the minimum speech power;

third program code means for causing the processor to compare each of the normalized speech power levels with a predetermined threshold value to detect speech segments in the input speech signal;

fourth program code means for causing the processor to determine one of the frames as being a start-point candidate for a starting point of a speech segment in the input speech signal when the normalized speech power level for said one of the frames is larger than a first power threshold; and fifth program code means for causing the processor to determine said one of the frames as being the starting point of the input speech signal when a cumulative sum of a total power and another speech power level for a following one of the frames is larger than a second power threshold.

12. The computer-readable medium of claim 11, further comprising:

sixth program code means for causing the processor to determine one of the frames as being an end-point candidate for an end point of a speech segment in the input speech signal when the normalized speech power level for said one of the frames is less than a third power threshold; and seventh program code means for causing the processor to determine said one of the frames as being the end point of the input speech signal when a time interval indicated by a time threshold has passed from said one of the frames while a cumulative sum of a total power and another normalized speech power level for a following one of the frames is less than the second power threshold.

* * * * *